No. 629,371. Patented July 25, 1899.
C. W. KENNEDY.
STORAGE BATTERY.
(Application filed Aug. 29, 1898.)
(No Model.)
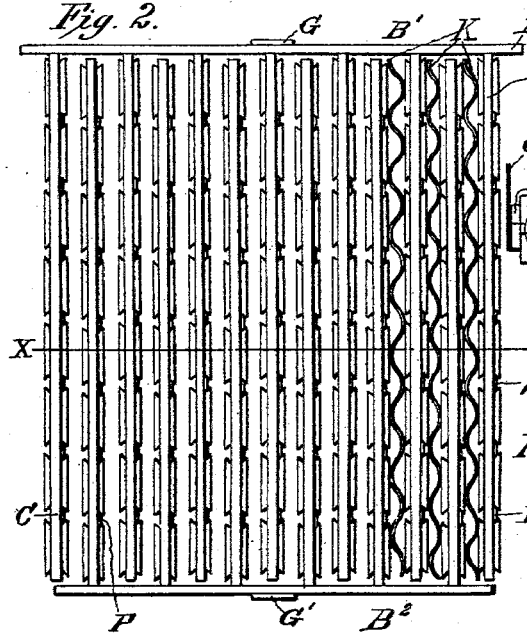
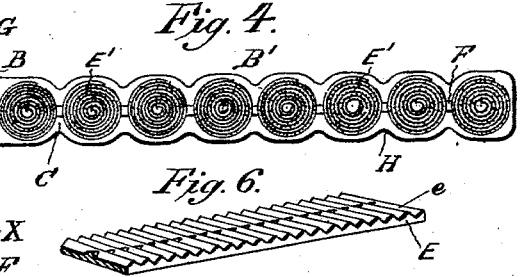
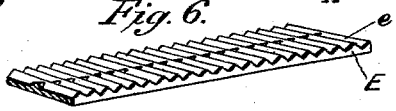
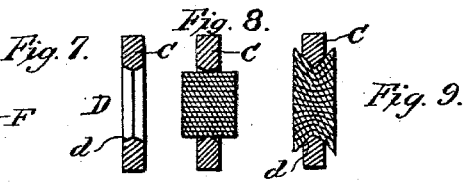
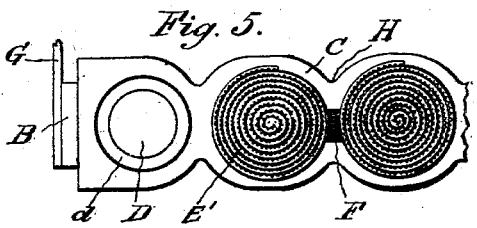
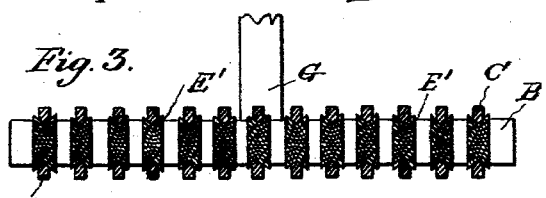
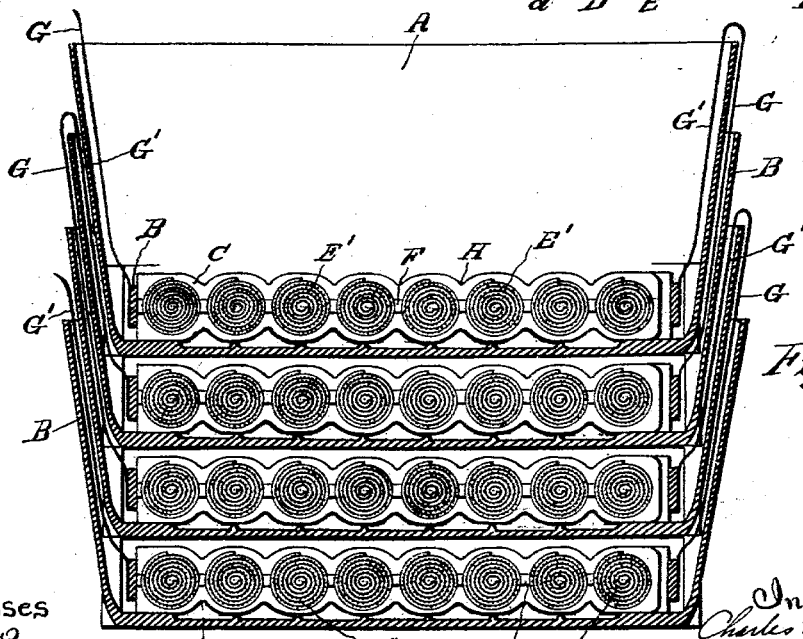
Witnesses
Inventor
Charles W. Kennedy
by Attorney

UNITED STATES PATENT OFFICE.

CHARLES W. KENNEDY, OF RUTLEDGE, PENNSYLVANIA, ASSIGNOR, BY MESNE ASSIGNMENTS, TO THE ELECTRIC POWER DEVELOPMENT COMPANY.

STORAGE BATTERY.

SPECIFICATION forming part of Letters Patent No. 629,371, dated July 25, 1899.

Application filed August 29, 1898. Serial No. 689,792. (No model.)

*To all whom it may concern:*

Be it known that I, CHARLES W. KENNEDY, a citizen of the United States, residing at Rutledge, in the county of Delaware and State of Pennsylvania, have invented certain new and useful Improvements in Storage Batteries, of which the following is a specification, reference being had therein to the accompanying drawings.

Figure 1 is a vertical section of a storage battery having parts embodying my improvements. Fig. 2 is a plan view of the electrodes of a couple detached. Fig. 3 in a section on the line $x$ $x$ of Fig. 2. Fig. 4 is a side view of one of the electrodes. Fig. 5 is a partial side view of the same on a larger scale. Fig. 6 is a perspective of a part of one of the lead strips from which the pellets are formed. Fig. 7 is a vertical section of one of the bars of an electrode-arm. Fig. 8 is a similar section showing the pellet at the time of first insertion. Fig. 9 is a similar section showing the pellet after it is expanded.

In the drawings I have shown my improvements as applied to a storage or secondary battery of one of the forms now well known; but as the present invention relates particularly to the manner of constructing and arranging the parts of the electrodes it will be understood that the cells or cups can be of any well-known form. Those illustrated are cups of hard rubber, for instance, (shown at A,) they having their side walls flared upwardly and outwardly and their bottoms arranged to rest directly one upon another. In these cells are placed the electrodes having my present features of improvement. The structural features of the positive and negative electrodes of each couple are substantially the same, though more particular reference may be made to the positive in order to understand their parts. There is a frame or carrier consisting of the bar B and bars C, secured to and extending transversely thereof, the latter bars being unsupported (and separated from each other) at their outer ends. Each bar C is formed with a series of apertures D of relatively large diameter and as closely together as possible. In these apertures are placed "pellets" or masses of active material. The latter are formed from strips of lead tape, such as shown at E, of which suitable lengths are taken and bent to form tight coils. Prior to the coiling they are subjected to the action of corrugating devices, preferably of the form of a ribbed roller working in opposition to a companion roller and by means of which comparatively sharp and well-defined V-shaped grooves $e$ are formed in one or both surfaces of the tape. After a coil of sufficient diameter has been formed it is driven tightly into one of the apertures at D, as illustrated in Fig. 8. The edge of the aperture is preferably flared or beveled somewhat, as at $d$, this making ample provision for the expansion of the lead, which, as is well known, occurs after the commencement of the electrolytic action. Such expansion causes the pellet to assume more or less of the form shown in Fig. 9, and the edges of the tape are allowed to assume this shape because of the taper of the walls of the aperture D.

The corrugations and grooves on the surface of the tape provide a great number of minute passage-ways through which the electrolyte liquid can freely circulate, and thus reach every point of the surface of the lead.

I provide an electrical connection from one pellet to another and from the pellets to their carrying arms or plates, these consisting of metallic pieces F F, closely joined to the metal of the pellets and preferably united also to the metal of the electrode bars or arms. Not only do I provide a great exposure of active surface by arranging the pellets in the way described, but, as stated, furnish a free circulation of the electrolyte and obviate, practically, entirely all of the buckling, warping, or bending of the parts of the electrode. After the pellets are inserted and before being put into use their wider outer or exposed faces may be enlarged by mechanical means, if desired, as by pressure, so that said faces shall be wider than the aperture in which they are inserted. Whether this widening is thus effected or results from the electrolytic expansion, it insures that the pellets shall be firmly locked against escape from the bars or plates.

One of the serious objections to storage batteries is the great weight incident to them because of the presence of a large amount of inactive metal in the plates and other parts. This has largely prohibited their use for many purposes, such as the propulsion of vehicles, boats, &c. I have succeeded in overcoming this to a large extent in batteries of the sort illustrated. I employ bars, such as shown, which are relatively narrow, and provide each with a series of large apertures to receive the pellets and reduce the bars on lines intermediate of the pellets, as is shown at H. Only sufficient solid metal is retained to furnish what may be regarded as a series of ring-like holders, and the proportion of the active metal to the inactive is greatly increased. The arms or bars of the negative electrodes alternate with those of the positive, all lying in substantially the same horizontal planes, and the bottoms of the cells can be brought close together, the result being a great reduction in weight and economizing of space. The positive and negative electrode bars are spaced and held apart by insulators, such as shown at K.

What I claim is—

1. An electrode for a storage battery having a series of bars or plates provided with perforations, each perforation having the surrounding metal reduced to a thin edge in or near the central transverse plane of the perforation, and pellets tightly inserted in the said perforations, each pellet being formed of coils or rings of active material adapted to expand radially of the apertures substantially as set forth.

2. An electrode for a storage battery having a series of relatively thin narrow bars of solid metal provided with perforations, the edge wall of each perforation being tapered from the surface of the bar to the center, and pellets of active material formed of coils or rings of metal, each coil being tightly inserted in one of said perforations and tapering in opposite directions from the center of its aperture continuously to the outer faces of the pellets.

In testimony whereof I affix my signature in presence of two witnesses.

CHARLES W. KENNEDY.

Witnesses:
  RICHARD B. CAVANAGH,
  H. H. BLISS.